United States Patent [19]

Fodor

[11] Patent Number: 4,819,368
[45] Date of Patent: Apr. 11, 1989

[54] DISPOSABLE MOUSETRAP

[76] Inventor: John Fodor, 13 Village Park Cir., Morgantown, W. Va. 26505

[21] Appl. No.: 552,153

[22] Filed: Nov. 14, 1983

[51] Int. Cl.⁴ .................... A01M 23/18; A01M 23/02
[52] U.S. Cl. ........................................................ 43/61
[58] Field of Search .................... 43/61, 60, 62, 67, 70

[56] References Cited

U.S. PATENT DOCUMENTS

| 2,573,228 | 10/1951 | Slauth | 43/61 |
| 2,598,007 | 5/1952 | McCormick | 43/61 |
| 3,729,852 | 5/1973 | Holmes | 43/61 |
| 3,823,504 | 7/1974 | Dosch | 43/61 |
| 4,142,320 | 3/1979 | Marcolina | 43/61 |
| 4,231,180 | 11/1980 | Bare | 43/61 |
| 4,232,472 | 11/1980 | Muelling | 43/61 |
| 4,238,902 | 12/1980 | Holl et al. | 43/61 |

Primary Examiner—Kurt Rowan
Attorney, Agent, or Firm—Mason, Fenwick & Lawrence

[57] ABSTRACT

A disposable rodent trap is formed of an aluminum beverage can comprising an internal chamber, a bottom end wall with an opposite end wall including an entry opening therein of sufficient size to permit a rodent to pass into the internal chamber. A door member in the form of a can end is positioned externally of said end wall and movable into a closed position covering and blocking the entry opening by a rubber band. A latch means normally holds the door open by engagement with an edge surface of the entry opening but is movable by rodent contact inside the chamber to unlatched position to permit the rubber band to move the door member to its closed postion to trap the rodent in said internal chamber.

15 Claims, 2 Drawing Sheets

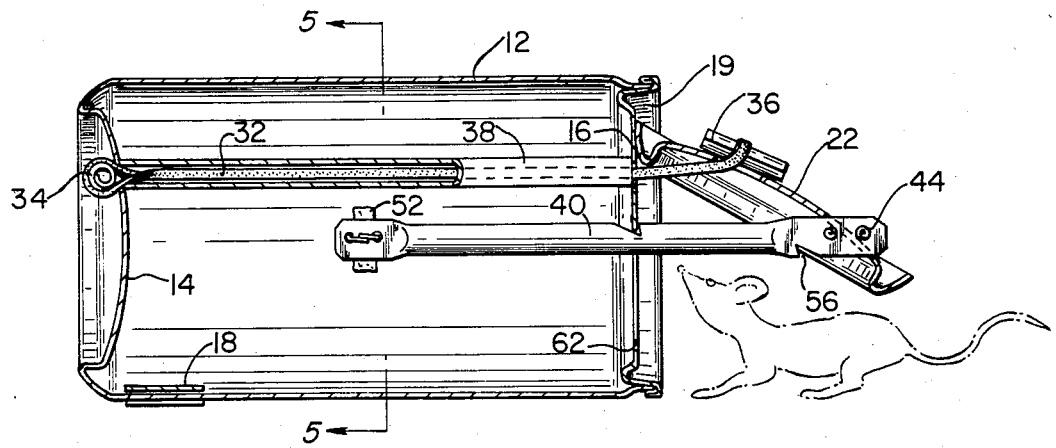
FIG. 3
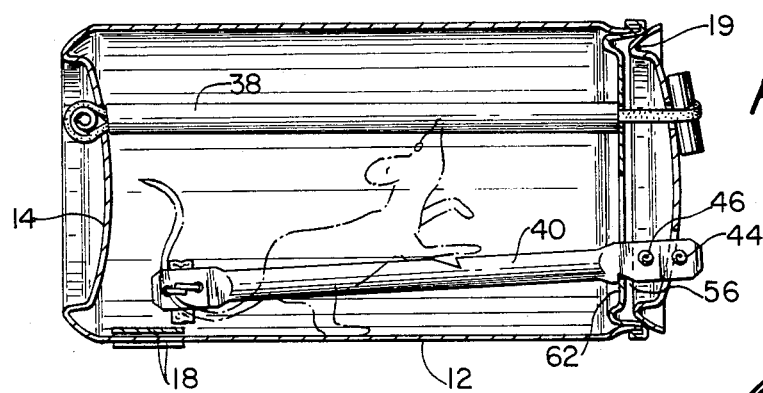
FIG. 4
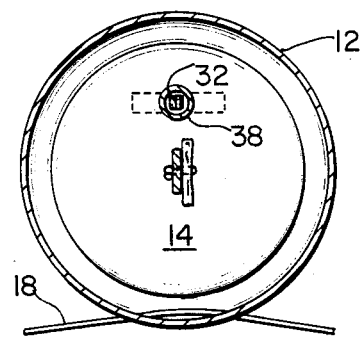
FIG. 5
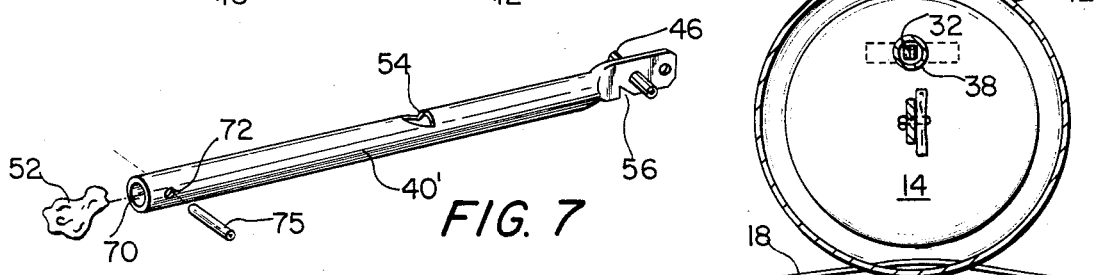
FIG. 7
FIG. 6

4,819,368

DISPOSABLE MOUSETRAP

BACKGROUND OF THE INVENTION

The present invention is in the field of animal trapping devices and is more specifically directed to a unique disposable rodent trap of particular value for capturing mice.

Numerous devices have evolved over the years for either capturing or killing mice. Many of the known devices have suffered from a number of shortcomings such as failing to operate properly and being overly expensive to fabricate. The most relevant prior known U.S. Patents comprise U.S. Pat. Nos. 100,986; 924,237; 1,261,189; 1,326,662; 1,372,663; 1,415,093; 1,861,478; 2,087,646; 2,434,031; 2,437,020; 2,573,228; 2,608,018; 3,426,470; 3,729,852; 3,733,735; 3,992,802. The present invention overcomes the shortcomings of the foregoing patents in providing a fool-proof functionally operational device that is quick and effective for capturing mice or other rodents and which is economical to fabricate and assemble due to the use of well-known widely available materials many of which are presently thrown away as scrap. It is consequently possible to simply dispose of the subject invention following the capture of a mouse or other rodent.

Therefore, it is the primary object of the present invention to provide a new and improved rodent trap which is functionally more effective than prior known rodent traps and is also economical to fabricate and assemble.

SUMMARY OF THE INVENTION

Achievement of the foregoing objects is enabled by the preferred embodiment of the invention in a remarkably effective manner. More specifically, the preferred embodiment of the invention comprises a container in the form of an aluminum beverage can of the type normally used for beer, soft drinks or the like. Such cans comprise a cylindrical wall member having a bottom end wall and a dispensing end wall with the dispensing end wall of the can used in the present invention including an elongated transverse entry opening of sufficient size to permit the passage of a rodent into the interior of the can.

A movable door is positioned adjacent the dispensing end wall of the can and is connected to an elongated latch member comprising an elongated tubular rod which extends into the interior of the can. Also, a rubber band extends from the bottom wall of the can through the length of the can outwardly through an opening provided in the dispensing end wall and is connected to the movable door member so as to urge the movable door member toward a closed position in which it overlies the entry opening and completely blocks same. The latch member includes a transverse surface engagable with a catch surface adjacent the edge of the entry opening so as to hold the door member in an open position against the urging of the elastic rubber band member. A tubular metal sheath encloses the rubber band member across the span between the dispensing end wall and the bottom end wall of the can so as to prevent any captured rodent from gnawing through the rubber band to permit the door to then open.

The inner end of the tubular latch member is provided with means for retaining bait on the inner end of the latch member for the purpose of attracting mice or other rodents so as to cause them to enter the interior of the can. When such a mouse has entered the can, he will attempt to eat the bait and will dislodge the tubular latch member from engagement with the catch surface so that the elastic rubber band member immediately snaps the door closed and the rodent is consequently entrapped within the confines of the can. Additionally, the latch member is also provided with a lock latch surface which engages a second catch surface along the inside edge of the entry opening upon closure of the door member so as to lock the door member in closed position. Thus, the operation of the elongated elastic rubber band member and the lock surface provides a dual locking function to preclude escape of a captured rodent. In one embodiment of the invention the latch tube receives the bait member in an open-ended recess adjacent the end of the latch member with a transverse bore opening being provided on opposite sides of the opening so as to permit impalement of the bait by a retaining pin extended therethrough. In a second embodiment the bait is retained on the end of the latch member by a wire clip or the like extending through openings provided in a flattened end of the latch member.

BRIEF DESCRIPTION OF THE DRAWING

FIG. 3 is a sectional view taken along lines 3—3 of FIG. 1 and illustrating the door in an opened condition;

FIG. 4 is a sectional view similar to FIG. 3 but illustrating the door in the closed position for imprisoning a rodent;

FIG. 5 is a sectional view taken along lines 5—5 of FIG. 3;

FIG. 6 is a side elevation view of a second embodiment with portions removed for the sake of illustration; and FIG. 7 is a perspective view of a second embodiment of tubular latch means employed in the invention.

DESCRIPTION OF THE PREFERRED EMBODIMENTS

Figure 1:
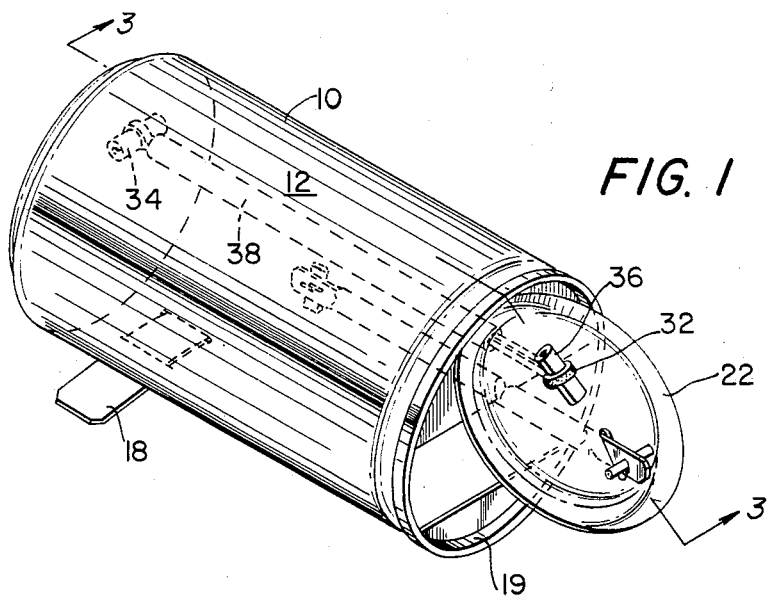
FIG. 1 is a perspective view of the preferred embodiment of the invention illustrating the door member in open position.
Figure 2:
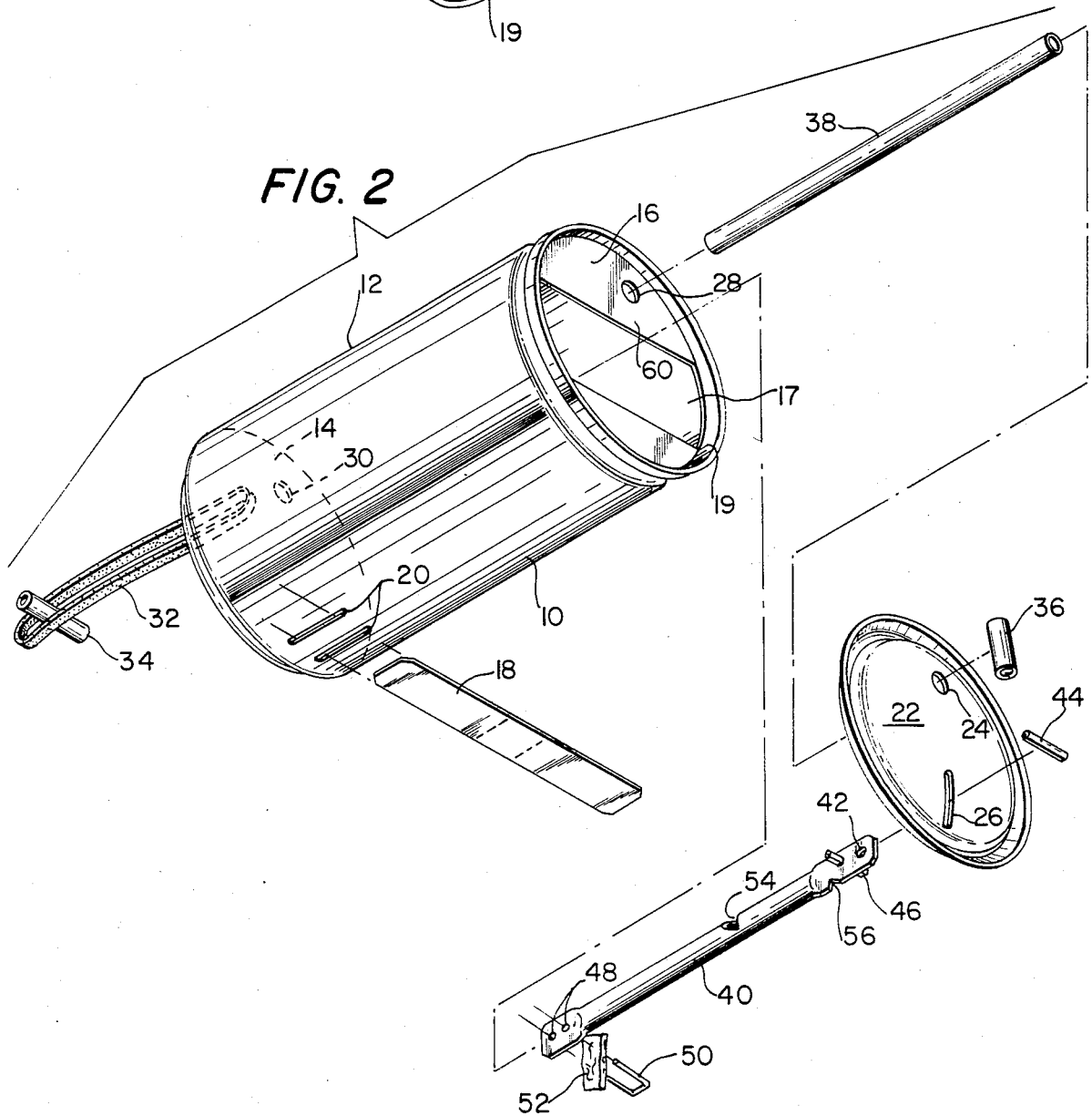
FIG. 2 is an exploded perspective view of the embodiment of FIG. 1.

The preferred embodiment of the invention as illustrated in FIGS. 1 etc. comprises a disposable rodent trap including a container 10 in the form of a disposable aluminum beverage container having a cylindrical body wall 12, a bottom end wall 14 and a dispensing end wall 16. It should be observed that the bottom end wall 14 is normally the "bottom" wall when the beverage can is used for its original purpose whereas the dispensing end wall 16 is the end from which the beverage contained within the container is dispensed. Dispensing end wall 16 includes an opening 17 of sufficient size to permit the passage of a rodent therethrough so as to enter the interior of the container can 10 and also includes a peripheral flange 19. A stabilizer tab 18 extends through slots 20 provided in the cylindrical body wall 12 as best shown in FIG. 2. Stabilizer tab 18 prevents the can from rolling on a supporting surface in an obvious manner.

A floating door 22 comprising an end wall from a similar can is positioned adjacent and in contact with the dispensing end wall 16. Floating door 22 is provided with an upper circular opening 24 and a lower slot 26.

The upper circular opening 24 is in general alignment with an opening 28 in the dispensing end wall 16. The bottom end wall 14 is provided with an opening 30 in alignment with the opening 28 of the dispensing end wall. Biasing means in the form of an elastic rubber band member 32 extends through the openings 28 and 30 with the end of the biasing elastic rubber band member 32 adjacent the bottom wall 14 being anchored by a tubular anchor lug 34 while the opposite end of the rubber band member which extends through openings 28 and 24 is anchored by a similar lug 36. The lug members 34 and 36 can for example be formed of rolled pieces of aluminum scrap or the like. Thus it will be seen that the tension in rubber band 32 tends to move the floating door member 22 toward a closed position. A protective sheath 38 formed of metal in the form of aluminum or the like extends between the bottom wall 14 and the dispensing end wall 16 to fully enclose the rubber band 32 to prevent any rodent on the interior of the can from gnawing or eating through the band so as to cause its failure.

An elongated tubular latch member 40 is provided internally of the container can 10 and includes a flat outer end 42 which extends through the slot 26 and is held in position by an outer keeper pin 44 and an inner keeper pin 46 which are respectively on opposite sides of the floating door member 22. The inner end of the elongated tubular latch member 40 is provided with a pair of openings 48 through which a bait retention loop or wire or the like 50 extends so as to permit the attachment of bait 52 to the end of the latch member. Latch member 40 includes a first transverse latch surface 54 and a second transverse oppositely facing lock surface 56.

When the floating door 22 is in its open position the latch surface 54 is engaged with an upper external catch surface 60 extending along entry opening 17 in the dispensing end wall 16. Thus, the latch member retains the floating door in its open position. A mouse or other rodent can enter the opening 17 and upon attempting to eat the bait 52 will effect dislodging of the latch surface 54 from the catch surface 60 to immediately result in a rapid and quick movement of the door member 22 from the open position of FIG. 3 to the closed position of FIG. 4. The rodent on the interior of the container will consequently be imprisoned. Moreover, movement of the floating door 22 to the closed position immediately results in the lock surface 56 becoming engaged with a lower catch inside surface 62 as shown in FIG. 4. Thus, the floating door member 22 will be held in closed position by operation of the lock surface 56 as well as the elastic urgings of the rubber band 32.

FIG. 6 illustrates a slightly simplified embodiment in which the protective sheath 38 is dispensed with and the bare rubber band extends between the bottom wall 14 and the dispensing wall 16. The advantage of this embodiment is that it is slightly easier to manufacture. Additionally, the embodiment of FIG. 6 is illustrated with a second embodiment latch member 40' which is basically identical to the first latch member with the exception of the manner in which the bait 52 is connected to the inner end of the latch member. More specifically, the inner end of the latch member 40' includes an open end chamber or cavity 70 through which diametric openings 72 extend with the chamber or cavity 70 being of sufficient size to receive the bait 52. A retention pin 75 extends through the opening 72 and the bait 52 to retain the bait 52 in the end of the latch member in the manner shown in FIG. 6. Otherwise, the second embodiment operates in exactly the same manner as the first embodiment.

It should be understood that, while preferred embodiments of the invention are illustrated herein, numerous modifications of the disclosed embodiments will undoubtedly occur to those of skill in the art. For example, practice of the invention is not limited to the use of beverage cans and other type cans or containers of larger sizes could be employed. In fact, it would even be possible to practice the present invention by the use of such large containers as oil drums or the like for use in capturing larger animals. Consequently, the use of the term "rodent" as discussed herein and as set forth in the claims should be broadly interpreted to include other types of animals. For these reasons, the spirit and scope of the invention should be broadly interpreted.

I claim:

1. A disposable rodent trap comprising a container defining an internal chamber, an end wall having an entry opening therein of sufficient size to permit a rodent to pass therethrough so as to enter said internal chamber, a door member provided externally of said end wall and movable from an open position toward said end wall into a closed position covering and blocking said entry opening, biasing means comprising a rubber band for urging said door member toward its closed position, latch means having a portion inside said chamber and extending between said door member and a catch surface on, and forming part of, said end wall comprising an edge surface adjacent said entry opening for normally holding said door member in its open position but being movable by rodent contact inside said chamber out of contact with said catch surface to permit said biasing means to move said door member to its closed position to entrap the rodent in said internal chamber and wherein said container is a disposable beverage can having a cylindrical body wall, a bottom end wall and a dispensing end wall with said entry opening being provided in said dispensing end wall which comprises a wall from which beverage would normally be dispensed during usage of said beverage container for its original purpose.

2. The invention of claim 1 wherein said latch member comprises an elongated tube connected at one end to said door member and having a transverse latch surface medially of its length for engaging said catch surface adjacent one edge of said entry opening and further including a lock latch surface extending transversely of said tubular member at a location near the door member for engaging an inner edge surface of said entry opening for latching said door member in said closed position.

3. A rodent trap as recited in claim 2 additionally including a tubular sheath extending between said bottom end wall and said opening in said dispensing end wall for enclosing said rubber band portion inside said internal chamber for preventing any rodent in said chamber from chewing on said rubber band.

4. A disposable rodent trap as recited in claim 3 wherein said door member comprises a can end from a similar can which has one end engaged with said dispensing end wall, said dispensing end wall including a peripheral flange surface which retains said door member in position.

5. A rodent trap as recited in claim 4 wherein said latch member includes means on its end opposite its end connected to said door member for retaining rodent attracting means thereon.

6. A rodent trap as recited in claim 5 additionally including transversely extending means connected to said body wall and engagable with a supporting surface for said rodent trap for maintaining said rodent trap in fixed position on said supporting surface.

7. A rodent trap as recited in claim 6 wherein said bottom end wall is provided with an aperture through which one end of said rubber band extends to provide an external loop of said rubber band and wherein said rubber band is connected to said wall by an elongated anchor lug passed through said loop.

8. A rodent trap as recited in claim 7 wherein said door member is provided with an opening through which a loop of said rubber band extends and further includes an anchor lug extending through said loop for retaining said loop externally of said door member.

9. A rodent trap as recited in claim 8 wherein said door member includes a slot through which one end of said latch member extends and said latch member includes keeper pins extending transversely through said latch member on opposite sides of said door member so as to retain said latch member in said slot.

10. A rodent trap as recited in claim 4 wherein said latch member has an open-ended bait receiving cavity on its end opposite its connection to said door member.

11. A disposable rodent trap comprising a container defining an internal chamber, an end wall having an entry opening therein of sufficient size to permit a rodent to pass therethrough so as to enter said internal chamber, a door member provided externally of said end wall and movable from an open position toward said end wall into a closed position covering and blocking said entry opening, biasing means for urging said door member toward its closed position, latch means having a portion inside said chamber and extending between said door member and a catch surface on, and forming part of, said end wall for normally holding said door member in its open position but being movable by rodent contact inside said chamber out of contact with said catch surface to permit said biasing means to move said door member to its closed position to entrap the rodent in said internal chamber and wherein said container is a disposable beverage can having a cylindrical body wall, a bottom end wall and a dispensing end wall with said entry opening being provided in said dispensing end wall which comprises a wall from which beverage would normally be dispensed during usage of said beverage container for its original purpose and wherein said biasing means comprises an elastic band having one end secured to said bottom end wall, said second end wall includes a small opening spaced from said entry opening and the opposite end of said elastic band extends through said small opening and is secured to said door member by retainer pin means.

12. The invention of claim 11 wherein said latch member comprises an elongated metal tube connected at one end to said door member and having a transverse latch surface medially of its length for engaging said catch surface and further including a lock latch surface extending transversely of said tubular member at a location near the door member for engaging an inner edge surface of said entry opening for latching said door member in said closed position.

13. A rodent trap as recited in claim 12 additionally including a tubular sheath extending between said bottom end wall and said opening in said dispensing end wall for enclosing said elastic band portion inside said internal chamber for preventing any rodent in said chamber from chewing on said rubber band.

14. A disposable rodent trap as recited in claim 13 wherein said door member comprises a can end from a similar can which has one end engaged with said dispensing end wall, said dispensing end wall including a peripheral flange surface which retains said door member in position.

15. A rodent trap as recited in claim 14 wherein said latch member includes attachment means on its end opposite its end connected to said door member for retaining rodent attracting means thereon.

* * * * *